United States Patent
Li et al.

(10) Patent No.: US 10,754,814 B1
(45) Date of Patent: Aug. 25, 2020

(54) METHODS AND SYSTEMS FOR IMAGE-BASED AUTHENTICATION

(75) Inventors: Jin Li, Bellevue, WA (US); Siobhan M. O'Toole, Seattle, WA (US); Yi Sun, Bellevue, WA (US); Nghia C. Tran, Seattle, WA (US); Mehmet T. Cezik, Seattle, WA (US); Jiun-Hung Chen, Seattle, WA (US); Srinivasan Krishnan, Seattle, WA (US); Yilun Cui, Pittsburgh, PA (US)

(73) Assignee: Amazon Technologies, Inc., Seattle, WA (US)

( * ) Notice: Subject to any disclaimer, the term of this patent is extended or adjusted under 35 U.S.C. 154(b) by 1029 days.

(21) Appl. No.: 13/334,797

(22) Filed: Dec. 22, 2011

(51) Int. Cl.
  *G06F 7/04* (2006.01)
  *G06F 15/16* (2006.01)
  *H04L 29/06* (2006.01)

(52) U.S. Cl.
  CPC .............. *G06F 15/16* (2013.01); *H04L 29/06* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 6,980,081 B2* | 12/2005 | Anderson | ............... | G06F 21/36 340/5.51 |
| 2003/0210127 A1* | 11/2003 | Anderson | ............... | G06F 21/36 340/5.27 |
| 2004/0010721 A1* | 1/2004 | Kirovski | ................. | G06F 21/36 713/183 |
| 2004/0030934 A1* | 2/2004 | Mizoguchi | .............. | G06F 21/36 726/18 |
| 2004/0093527 A1* | 5/2004 | Pering et al. | .................. | 713/202 |
| 2004/0219902 A1* | 11/2004 | Lee | .......................... | G06F 21/36 455/410 |
| 2004/0230843 A1* | 11/2004 | Jansen | ..................... | G06F 21/36 726/7 |
| 2006/0021024 A1* | 1/2006 | Park | ......................... | G06F 21/36 726/17 |
| 2006/0230435 A1* | 10/2006 | Kokumai | ............... | G06F 21/445 726/4 |
| 2006/0282660 A1* | 12/2006 | Varghese | ............. | G06Q 20/341 713/155 |

(Continued)

OTHER PUBLICATIONS

Article "Windows 8 gesture login: Can screen smudges reveal your password?" web page available at http://arstechnica.com/business/news/2011/12/windows-8-picture-login-dont-let-smudges-reveal-your-password.ars. dated Jan. 6, 2012.

(Continued)

*Primary Examiner* — Phy Anh T Vu
(74) *Attorney, Agent, or Firm* — Athorus, PLLC

(57) ABSTRACT

A system and method for performing image-based authentication requires users to enter an image-based password in order to access a secure system or network. A user may identify at least one password image, and may enter the system or network if he or she selects each of the password images shown in a group of images on the display. Additionally, the user may designate specific locations for multiple password images on a user interface, and a user may enter the system or network if he or she locates each of the password images in its designated location on the user interface.

4 Claims, 8 Drawing Sheets

(56) References Cited

U.S. PATENT DOCUMENTS

| | | | | |
|---|---|---|---|---|
| 2006/0288234 A1* | 12/2006 | Azar | ............... | G06F 21/32 |
| | | | | 713/186 |
| 2007/0101150 A1* | 5/2007 | Oda | ............... | G06F 21/31 |
| | | | | 713/183 |
| 2007/0118737 A1* | 5/2007 | Shimizu | ............ | H04L 9/085 |
| | | | | 713/156 |
| 2007/0130618 A1* | 6/2007 | Chen | ............... | G06F 21/36 |
| | | | | 726/8 |
| 2007/0277224 A1* | 11/2007 | Osborn | ............ | G06F 21/36 |
| | | | | 726/2 |
| 2008/0052245 A1* | 2/2008 | Love | ............... | G06F 21/36 |
| | | | | 705/76 |
| 2008/0201578 A1* | 8/2008 | Drake | ............... | 713/172 |
| 2008/0222710 A1* | 9/2008 | Blagsvedt et al. | ............ | 726/7 |
| 2009/0172810 A1* | 7/2009 | Won | ............... | G06F 21/36 |
| | | | | 726/19 |
| 2009/0320124 A1* | 12/2009 | Taxier et al. | ............ | 726/17 |
| 2010/0058437 A1* | 3/2010 | Liew | ............... | G06F 21/36 |
| | | | | 726/2 |
| 2010/0180336 A1* | 7/2010 | Jones | ............ | H04L 9/3226 |
| | | | | 726/19 |
| 2011/0126273 A1* | 5/2011 | Bhatia et al. | ............ | 726/7 |
| 2013/0232549 A1* | 9/2013 | Hawkes | ............ | 726/3 |

OTHER PUBLICATIONS

Confident® Technologies web pages available at www.confidenttechnologies.com dated Dec. 22, 2011.

* cited by examiner

METHODS AND SYSTEMS FOR IMAGE-BASED AUTHENTICATION

BACKGROUND OF THE INVENTION

Access to secure systems or networks, such as electronic mail systems or banking web sites, is often conditioned upon the entry of a character-based password or code, such as a Personal Identification Number ("PIN"), by an authorized user. Such passwords need not contain "words," and may include combinations of uppercase or lowercase letters, numbers and/or other American Standard Code for Information Interchange ("ASCII") characters, while PINs may generally include one or more numbers. Character-based passwords and PINs are typically used in combination with a corresponding user name or identifier assigned to someone who is authorized to access a secure system or network, and may either authenticate entry to the secured system or network by authorized users, or prevent access to such the system or network by unauthorized users. Unless a user name and corresponding password or PIN are entered, access is denied.

Passwords or PINs that consist solely of alphanumeric and/or ASCII characters have many intrinsic limitations, however. First, character-based passwords or PINs are more secure when they are longer, i.e., when they include a greater number of characters. Because a password must be committed to memory, many people choose character-based passwords that are easy to remember, such as a birthday or a relative's name. However, a password that is easy for a user to memorize may also be easy for a person with surreptitious motives, such as a "hacker" or "fraudster," to guess, predict or acquire covertly. Alternatively, the user may elect to record a lengthy password on a piece of paper. However, if such a piece of paper is obtained by a hacker or fraudster, he or she may enter the secure system or network by posing as the user, and take actions within the system or network on the user's behalf.

Second, because the entry of a character-based password is required to access a variety of systems or networks, many people use the same or similar user names and/or passwords for several different systems or networks. For example, a person may utilize the same password, or similar passwords, to access his or her electronic mail account, bank account, credit card account or network server at work. If any one of these systems or networks is compromised, a hacker or fraudster may access the user's other accounts that are protected by the same password, or predict the user's passwords on other accounts having similar passwords, and thereby expose the user to a cascading risk of widespread fraud across multiple accounts.

Third, in an age when portable computing devices are increasingly able to perform a variety of functions, and are being built with smaller keyboards or other character-entry devices, the task of entering a lengthy character-based password may be difficult for users who wish to access secure systems or networks from such devices.

Fourth, and perhaps most importantly, the combinations available for use in character-based passwords or PINs are always mathematically limited in number. For example, a PIN formed from four digits has only $10^4$ (or 10,000) combinations of numbers available to users. Where a password may be formed from the twenty-six letters of the modern English alphabet, an eight-character password has $26^8$ (or 208,827,064,576) combinations of letters that are available to users. While this may be a very large number, a hacker or fraudster armed with computer-based processors may attempt to overcome a secure system or network by brute force, such as by running through each of the potential combinations of passwords or PINs very quickly, particularly if the hacker or fraudster is aware of personal information regarding the user that may suggest one or more combinations of letters or numbers that may more likely, or less likely, be included within a user's password or PIN.

DETAILED DESCRIPTION

Figure 1:
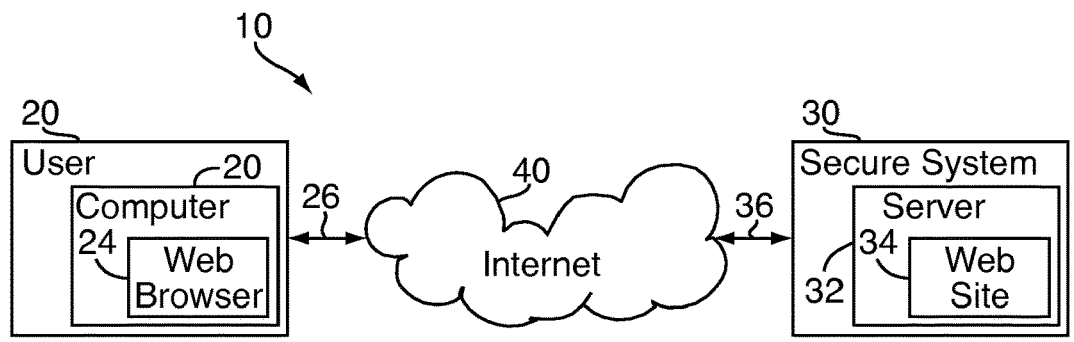
FIG. 1 is a block diagram of the components of a customer-merchant shopping system, in accordance with embodiments of the present disclosure.

As is set forth in greater detail below, the present disclosure is directed to systems and methods for providing image-based authentication. Specifically, the present disclosure describes systems and methods that permit users to establish passwords consisting of images, instead of letters, numbers or characters, and to provide those image-based passwords in response to a query prior to entering a secure system or network. Users may create an image-based password by providing a secure system or network with one or more user-designated password images, and may access the secure system or network by selecting the one or more password images displayed on a user interface, or by positioning the one or more password images onto predetermined locations of a user interface, where the images and locations are known only to the user.

According to one embodiment of the present invention, the network server at Jasper's office includes an image-based authentication system. When employees first register for access to the network server, the employees must establish a text-based username and password, each including one or more letters and numbers, and also identify four password images from an image cache or library containing a variety of images. The employees must then establish an image-based password by placing each of the four password images in specific locations within an empty four-by-four (4×4) grid. Each day, when Jasper arrives at work, he enters his text-based username and password into a user interface, and a four-by-four (4×4) grid containing sixteen images, including Jasper's four password images and twelve decoy images, is then displayed. Once Jasper identifies the four password images that he selected, and rearranges the sixteen images in the grid such that his four password images are positioned in the four specific locations associated with his image-based password, Jasper is entitled to access the network server.

According to another embodiment of the present invention, Andre registered to perform online banking services at his bank's web site. The bank required Andre to establish a character-based username and set a character-based password, and to also provide the web site with five password images. When Andre later attempted to access his account records at the bank's web site, he was first required to enter his character-based username and password. When Andre sought to transfer money from his savings account to his checking account, an array of nine images, including three of Andre's password images and six decoy images, was displayed. Before the bank would transfer the funds, Andre was prompted to select each of the password images displayed in the array, which were known only to him. If Andre correctly selected each of the three password images displayed in the array, the money would transfer from his savings account to his checking account. If Andre did not correctly select each of the three password images, he would be presented with a new array containing a different number of password images and decoy images. If Andre was still unable to select the displayed password images, the money would not transfer, and Andre would be locked out of the web site.

According to yet another embodiment of the present invention, Angela visits an electronic commerce web site to shop for Christmas gifts for her daughter. Angela is a repeat visitor to the web site, and has previously provided a character-based screen name and password, along with her credit card account information, and identified nine password images when she first registered at the web site. Angela arranged the images into a predetermined arrangement within a three-by-three (3×3) grid, in order to establish an image-based password. When Angela browsed the inventory of goods available for purchase at the web site, selected a set of items, and attempted to purchase the items using her stored credit card information, a first array of nine images including one password image and eight decoy images is displayed in a grid, and Angela is prompted to select the password image. If Angela selects the password image from the first array, then a second array of nine images, including all of the nine password images, is displayed in a grid, and Angela is then prompted to place the nine password images in their respective, predetermined locations within the grid. If Angela did not correctly select the password image from the first array of nine images, then a second array of nine images, not including any of her password images, is displayed in a grid. Angela is prompted to place the second array of password images in their respective predetermined locations within the grid, something she obviously cannot do, since the second array of nine images does not include any password images. Angela must then repeat the process, a new first array of nine images is displayed, containing a different one of the password images and eight new decoy images.

The systems and methods for image-based authentication described herein may be utilized to authenticate the entry of authorized users to any secure system or network, and to prevent unauthorized users from accessing any secure system or network, for which a password must be entered by a user. Such systems or networks include, but are not limited to, computers, electronic mail systems, electronic commerce web sites, banking web sites, network servers, or any like equipment, systems or networks. The systems and methods of image-based authentication may act as either a primary or a secondary barrier to entry, and may be utilized alone or in combination with other systems or methods. For example, the systems and methods described herein may replace systems that utilize character-based usernames or passwords to restrict access to a secure system or network, or be installed as a patch or addition to such systems.

Additionally, the systems and methods of image-based authentication described herein may be utilized to demarcate varying levels of access within a secure system or network, such as by requiring users to enter a character-based password to access one level, and an image-based password to access another level within the system or network. For example, for members at an electronic commerce web site, a first password (i.e., a character-based password) may be required in order to browse the available inventory at the web site, and a second password (i.e., an image-based password) may be required in order to purchase items using stored credit card information. The systems and methods disclosed herein may also be utilized to provide higher levels of protection for specific functions within a secure system or network. For example, a character-based password such as a PIN may be required in order to access a smart phone, and an image-based password may be required in order to perform certain other functions using the smart phone, such as to change the PIN.

The systems and methods of the present invention may be utilized in connection with any type of computer or like device. Additionally, because the systems and methods operate using passwords consisting of images, and not characters, the number of potential combinations of passwords is limitless, unlike character-based passwords formed from the twenty-six letters of the modern English alphabet, the ten Arabic numerals, or the 128 characters of the standard ASCII character set. Moreover, because humans are generally more apt to remember images, rather than letters, numbers or characters, the image-based passwords of the present invention are believed to be more secure than standard character-based passwords. For example, while a user may have difficulty recalling a lengthy character-based password that includes letters, numbers and/or punctuation marks, the user is unlikely to forget a password image that he or she personally selected, such as an image of a relative or an image that reminds the user of a memorable moment.

The systems, computers, servers, and the like described herein have the necessary electronics, software, memory, storage, data sources, firmware, logic/state machines, microprocessors, communication links, displays or other visual or audio user interfaces, printing devices, and any other input/output interfaces to perform the functions described herein, or to achieve the results described herein.

Referring to FIG. 1, the various components of an embodiment of a system 10 providing image-based authentication are shown. The system 10 includes a user 20 and a secure system 30 connected to one another over a network 40. The user 20 may utilize a computer 22 that operates an application, such as a web browser 24, that provides one or more user interfaces for accessing the network 40 via network connection 26. The secure system 30 may maintain a web site 34 operating on one or more servers 32 connected to the network 40 via network connection 36.

As is shown in FIG. 1, the computers and/or servers maintained by the user 20 and the secure system 30 may be connected to or otherwise communicate with one another through network connections 26, 36 for sending and receiving data over the network 40. Additionally, the web site 34 may transmit data for causing the display of user interfaces on or within applications, such as the browser 24, that include windows, boxes, pop-up windows, tool tips, text, hyperlinks, images or any other displays of data or content that may be expressed in such applications.

Those of skill in the pertinent art will recognize that the user 20 may operate the computer 22 and/or access the browser 24 using a keyboard, a keypad, a mouse, a stylus, a touch screen, or another device (not shown) or other methods for interacting with computers, applications or web sites, such as to scroll through lists or displays and "select" an item, link, node, hub or any other aspect of the present disclosure. The computers, servers, and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein.

Except where otherwise explicitly or implicitly indicated herein, the term "user" generally refers to a human who attempts to access a secure system or network using one or more computers, but may also refer to a computer or agent attempting to access a secure system or network using one or more other computers. Except where otherwise explicitly or implicitly indicated herein, the terms "secure system," "secure network," "restricted access system" or "restricted access network," or like terms, may refer to a computer-related system for which access is restricted to authorized users who undergo an authentication process prior to entry, i.e., by providing one or more passwords.

The user 20 may operate the computer 22 to access any web-enabled or Internet applications, such as a web browser 24, user interfaces or any other client-server applications or features for gaining entry into the secure system 30 over the network 40. In addition, the computer 22 may be, or include, any of a number of computing devices that are capable of communicating over the network, including but not limited to set-top boxes, personal digital assistants, mobile phones including "smart" phones, digital media players, web pads, tablets, laptop computers, desktop computers, electronic book readers, and the like. The protocols and components for providing communication between the user 20 and the secure system 30 are well known to those of ordinary skill in the pertinent art and thus need not be described in further detail herein.

The data and/or computer executable instructions, programs, firmware, software and the like (also referred to herein as "computer executable components") described herein may be stored on a computer-readable medium that is within or accessible by the computers and/or servers having sequences of instructions which, when executed by a processor (such as a central processing unit, or CPU), cause the processor to perform all or a portion of the functions and/or methods described herein. Such computer executable instructions, programs, software and the like may be loaded into the memory of the computer 22 or server 32 using drive mechanisms associated with the computer readable medium, such as a floppy drive, CD-ROM drive, DVD-ROM drive, network interface, or the like, or via external connections.

As used herein, the term "password" may refer to a series of data to be entered by a user in order to access, for example, a secure system or network, a computer system, a computer file or a computer application. As used herein, the term "character-based password" or "text-based password" may refer to a password consisting of one or more letters, numbers or ASCII characters, or strings of multiple words or groupings of characters that may be separated by spaces, commas, dashes, colons, semicolons, or any other delimiter. As used herein, the term "image-based password" may refer to a set of one or more "password images," or images, pictures, icons, symbols, logos or other like visual features designated by a user, as well as an arrangement of such images, or a sequence of selection of such images, established by a user. Password images may be designated by a user from a cache or image library (e.g., a local drive), downloaded from a network such as the Internet, or uploaded from a device such as a digital camera, scanner or smart phone. As used herein, the term "decoy image" may refer to an image displayed by a system or method of the present invention that is not a password image, but is intended to appear as such to unauthorized users.

According to one embodiment of the present disclosure, a user may establish an image-based password by defining a location for one or more password images on a user interface. For example, the user may define his or her image-based password by placing one or more password images in specific locations of an empty grid. When the user attempts to access a secure system or network, an array of multiple images may be displayed to the user in a user interface, including the one or more password images previously defined by the user, and he or she may be prompted to enter his or her image-based password by placing the password images in their respective designated locations of the grid.

According to another embodiment of the present invention, a user may establish an image-based password by selecting a plurality of password images that have been previously designated as such by the user. When the user attempts to access a secure system or network, an array of multiple images may be displayed to the user in a user interface, including one or more of the password images identified by the user. The user may then be prompted to enter his or her image-based password by selecting each of the password images that he or she sees in the user interface. Because the user personally designated the password images, he or she should be the only one able to discern how many password images are shown in the user interface, or to distinguish the password images from any decoy images that may be shown in the user interface.

According to yet another embodiment of the present invention, a system or method for providing image-based authentication may require a user to enter one or more image-based passwords in order to secure access to a system or network. For example, a user may be prompted to enter a first image-based password by selecting one or more password images displayed in an array, and a second image-based password by arranging one or more password images into predetermined locations on a user interface.

As is discussed above, an image-based password may be created by a user who designates specific images as password images, i.e., by selecting the images from a cache or library (such as a local drive), downloading the images from a network connection such as the Internet, or uploading the images from a device such as a camera, smart phone or scanner. A system or method according to the present invention may authenticate a user by displaying a plurality of images including one or more of the password images and one or more decoy images to the user, and prompting the user to select each of the password images that he or she sees on a screen, without prompting the user as to how many of the password images may be displayed.

Figure 2:
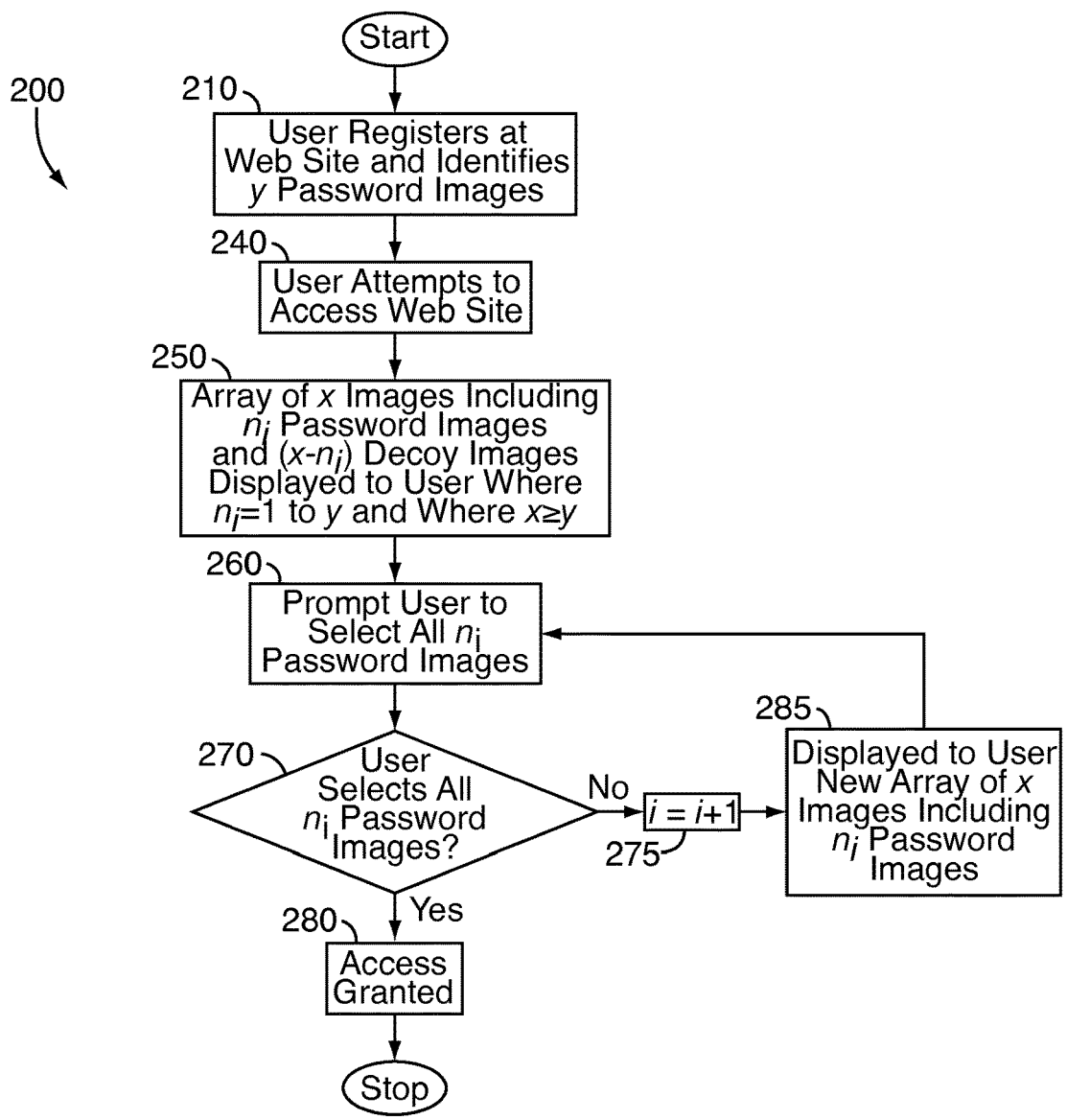
FIG. 2 is a flow chart of a method for performing image-based authentication in accordance with an embodiment of the present disclosure.

Referring to FIG. 2, a flow chart 200 representing one embodiment of a method for authenticating a user based on an image-based password at a secure system is shown. At step 210, a user may register for entry at a web site or other secure system or network, and provide the web site with y password images. Subsequently, at step 240, the user may attempt to access the web site, and at step 250, the web site may display an array of x images, including $n_i$ password images and $(x-n_i)$ decoy images, where $n_i$ may range from 1 to y (i.e., $1 \le n_i \le y$), where x is greater than or equal to y (i.e., $x \le y$), and where i may be the number of attempts by the user (i.e., iterations) to access the web site.

At step 260, the user is prompted to select each of the password images that he or she sees, but is not informed as to the number n of password images displayed in the array. At step 270, if the user selects each of the n password images displayed in the array, then the user is granted access to the system at step 280. If the user fails to select each of the $n_i$ password images, then, at step 275, the number of attempts i is increased by one (i.e., i=i+1), and at step 285, a new array of x images, including a new set of $n_i$ password images and $(x-n_i)$ decoy images, is displayed to the user, before the process returns to step 260.

The embodiment of the present invention represented by flow chart 200 in FIG. 2 provides a number of security enhancements or advantages for the authentication of the user in a number of ways. First, the total number of password images included in the array is never provided to the user who seeks authentication. Therefore, one who attempts to access a system protected by an image-based password has no way of knowing how many images he or she must select in order to access the system, unless he or she specifically designated those images. For example, where a user creates an image-based password by uploading five password images to a secure system, and an array of nine images is displayed to the user, such as at step 250 of the flow chart 200 in FIG. 2, the array may include one, two, three, four or five password images. A user must select all of the password images shown in the array, in order to access the system. Second, if a user fails to select each of the password images displayed in the first array, and a new array of x images is displayed, such as at step 285 of the flow chart 200 in FIG. 2, the new array may include a new set of $n_i$ password images, which may or may not include any of the same password images that were displayed in the first array. By selectively changing the combinations of images displayed to the user in subsequent iterations, embodiments of the present invention may deter hackers or fraudsters who attempt to try each and every combination of password images in order to correctly determine the image-based password, or to access the secure system by brute force.

Figure 3A:
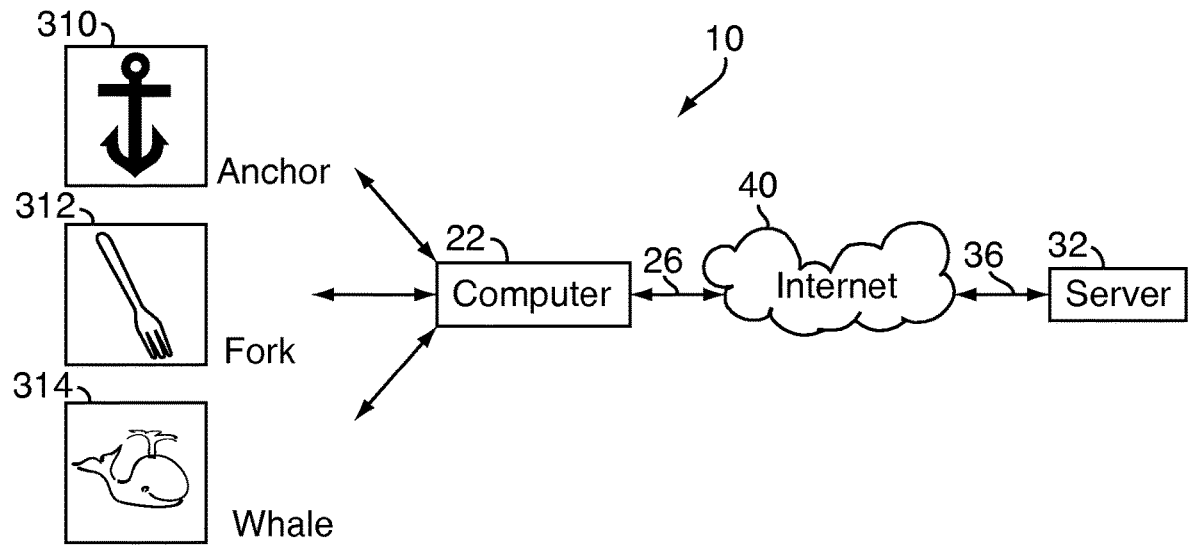
FIG. 3A is a block diagram of the components of a system for performing image-based authentication in accordance with an embodiment of the present disclosure.

Referring to FIG. 3A, a diagram of the various components of an embodiment of a system 10 providing image-based authentication are shown. The user may select any number of password images 310, 312, 314 using one or more applications operating on computer 22, and transfer the images to the server 32 through the network 40. The password images may be located in a local cache (e.g., a hard drive on the computer 22), downloaded or identified from the Internet, or uploaded from a mobile device such as a camera, smart phone or scanner.

Figure 3B:
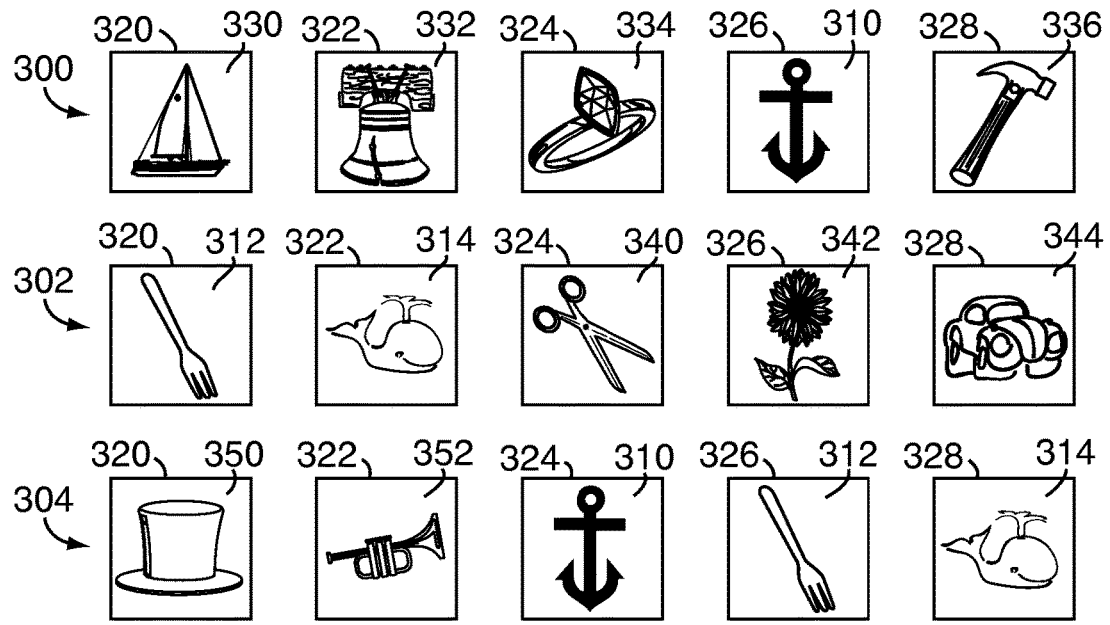
FIG. 3B includes a number of user interfaces in accordance with embodiments of the present disclosure.

As is set forth above, an array containing as few as one, and as many as all, of the password images designated by the user may be displayed in accordance with a system or method for performing image-based authentication. Referring to FIG. 3B, a plurality of exemplary arrays 300, 302, 304 of images that may be displayed to the user, such as at step 250 of the flowchart 200 in FIG. 2, are shown. Each of the arrays 300, 302, 304 includes five locations 320, 322, 324, 326, 328 for displaying various images. Array 300 includes one password image 310 and four decoy images 330, 332, 334, 336. Array 302 includes two password images 312, 314 and three decoy images 340, 342, 344. Array 304 includes three password images 310, 312, 314 and two decoy images 350, 352.

Any array containing one or more password images 310, 312, 314, such as the arrays 300, 302, 304 shown in FIG. 3B, may be displayed to a user in accordance with one embodiment of the present invention. The contents of the arrays may be randomly selected by the secure system, i.e., the number and type of password images included in the array, as well as the number and type of password images included in the array. For example, upon a user's first attempt to access the system, an array such as array 300 may be displayed to the user. If the user fails to select password image 310, and only password image 310, from the array 300, then an array such as array 302 may be displayed to the user. If the user fails to select password images 310, 312, and only password images 310, 312, then an array such as array 304 may be displayed to the user.

In embodiments of the present invention that require a user to enter an image-based password by selecting password images from an array of images, such as the process of flow chart 200 shown in FIG. 2, any number (i.e., as few as one) of the password images designated by the user, and as many as all of the password images designated by the user, may be displayed in an array. The random selection of the number of password images to be displayed to a user provides an added level of security, in that an attacker does not know whether it must select one, two, or all of the images in the array. For example, where the number of password images displayed in an array is known, i.e., where $n_i$ password images are displayed in an array of x images, the number of combinations from which a hacker or fraudster must randomly guess the image-based password is expressed by the binomial coefficient equation shown below as Equation (1).

$$\binom{x}{n_i} = \left( \frac{x!}{(x-n_i)! \cdot n_i!} \right) \quad (1)$$

Where the number of password images to be selected is unknown, however, the probability that a hacker or fraudster may guess the password is further reduced, because the hacker or fraudster must guess not only which images in the array are password images, but also how many of the images in the array are password images. It is believed that the number of combinations from which a hacker or fraudster must randomly guess the image-based password where the user has uploaded y password images, and the number of password images $n_i$ displayed in an array of x images is unknown, is expressed by the equation shown below as Equation (2):

$$y \cdot \binom{x}{n_i} = y \cdot \left( \frac{x!}{(x-n_i)! \cdot n_i!} \right) \quad (2)$$

where y is the total number of password images, $n_i$ is the number of password images displayed in an array, and x is the total number of images displayed in the array.

The systems and methods of the present invention may be utilized in connection with existing systems and methods that incorporate character-based user names and passwords prior to authenticating a user. According to one embodiment, the system may first request that the user enter an alphanumeric (i.e., character-based) user name and password. If the alphanumeric user name and password do not match those of an authenticated user in the database, the user is denied access, and the process ends.

If the user name and password correspond with those of an authenticated user in the database, then the secure system displays an array of x images, including n password images and (x−n) decoy images, in a grid. Next, the user is prompted to enter an image-based password by repositioning each of the password images that he or she sees in the grid to predetermined locations on the grid. In order to further deter would-be hackers or fraudsters, neither the number of password images displayed in the grid, nor the locations in the grid to which a password image must be repositioned, is identified. The password images may be repositioned by any means, such a click-and-drag using a mouse, keyboard, stylus or other form of pointer, or by dragging images along a touch screen using one or more fingers.

If the password images are repositioned into the predetermined locations in accordance with the image-based password established by the user, then the user is provided access to the system. If the password images are not repositioned into the predetermined locations in accordance with the image-based password, then the user is denied access to the system.

Figure 4:
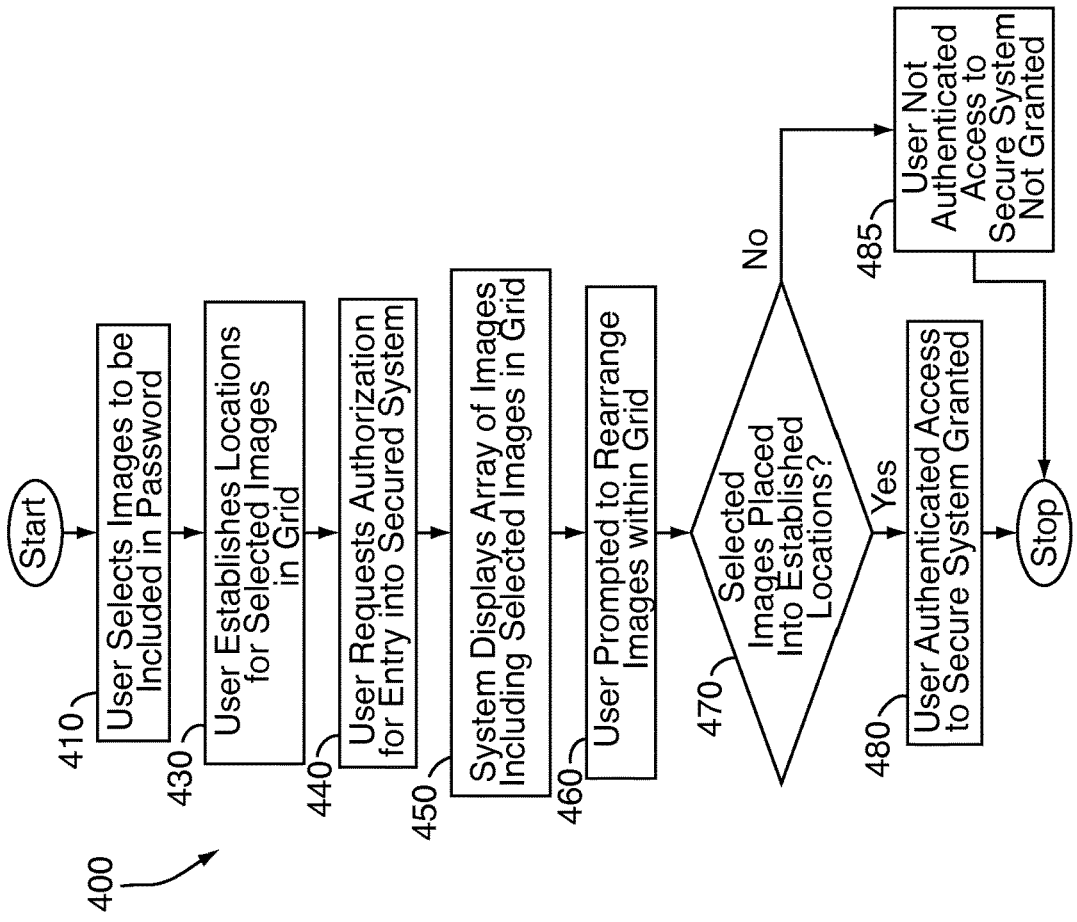
FIG. 4 is a flow chart of a method for performing image-based authentication in accordance with an embodiment of the present disclosure.

Referring to FIG. 4, a flow chart 400 representing one embodiment of a method for creating an image-based password and performing image-based authentication prior to granting access to a secure system or network is shown. Except where otherwise noted, reference numerals preceded by the number "4" in FIG. 4 indicate elements that are similar to elements of the flow chart 200 shown in FIG. 2.

At step 410, the user may select one or more password images, which may be locally available (i.e., stored on a hard drive or other local storage means), downloaded from a network connection, or uploaded from a device such as a camera, a scanner or a smart phone. At step 430, the user creates his or her image-based password by establishing specific locations for each of the password images in an empty grid displayed on a user interface. Preferably, the number of spaces in the grid is greater than the number of password images identified by the user at step 410, and the user may place each of the password images into a location on the grid of his or her choosing.

At step 440, the user may request authorization for entry into the secure system, such as by entering a character-based user name and a character-based password. At step 450, the secure system displays an array of images, including the password images selected by the user along with decoy images, i.e., images that are not password images, in random locations on a grid. For example, where a user selects three password images at step 410, and created an image-based password by placing three password images into established locations in a three-by-three grid (3×3) containing nine squares, the secure system may display the three password images and six decoy images in random locations in the grid.

At step 460, the user is prompted to rearrange the images in the grid, and to place the password images into the previously established locations in the grid. The images may be repositioned by any means, such a click-and-drag using a mouse, keyboard, stylus or other form of pointer. Alternatively, the user may drag images on a touch screen, such as on a mobile device, tablet or other form of computer, using one or more fingers.

At step 470, if the user places the selected images into the established locations in the grid, then at step 480, the user's request is authenticated, and the user is provided access to the secure system. If the user does not place the password images into the established locations in the grid, then at step 485 the user is not authenticated, and the user is not granted access to the secure system.

Figure 5A:
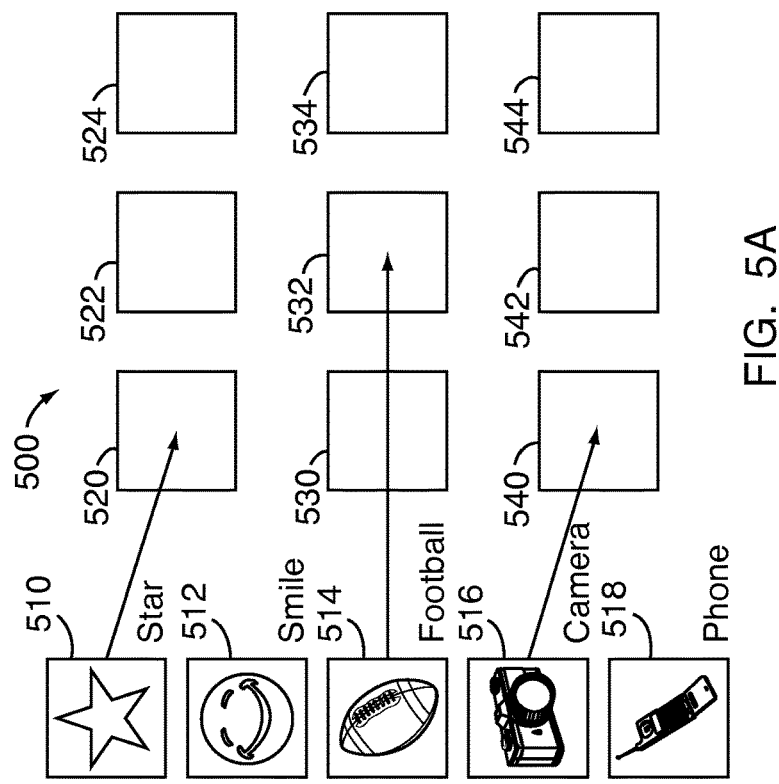
FIGS. 5A, 5B and 5C are user interfaces in accordance with embodiments of the present disclosure.
Figure 5B:
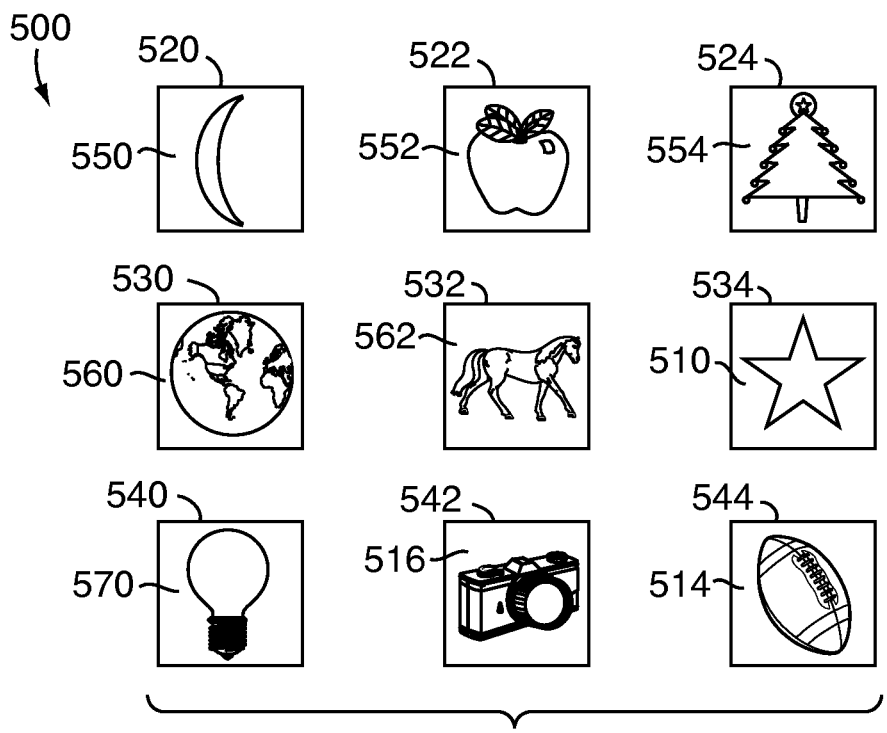
Figure 5C:
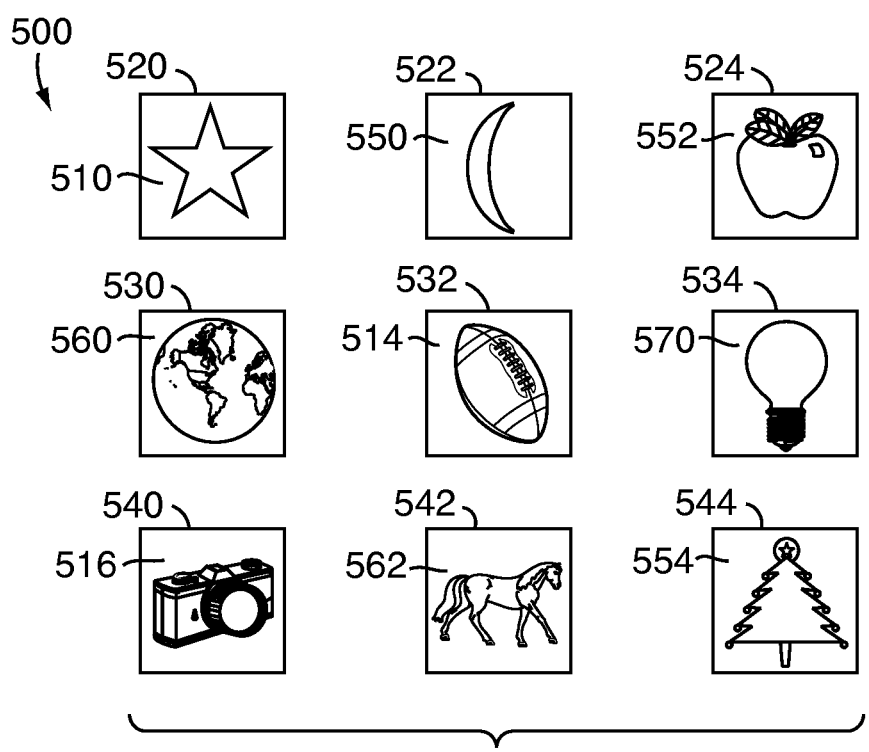

A series of user interfaces for establishing an image-based password consistent, and for performing image-based authentication, consistent with the process represented by flow chart 400 of FIG. 4 is shown in FIGS. 5A, 5B and 5C. Referring to FIG. 5A, a user creates an image-based password by selecting one or more password images, and by placing the password images that he or she selected into established locations within a grid 500. As is shown in FIG. 5A, the user selects images 510, 514, 516 and places the images in locations 520, 532, 540, respectively, within grid 500.

Referring to FIG. 5B, after a user requests authorization for entry into the secure system, a plurality of images including password images 510, 514, 516 and decoy images 550, 552, 554, 560, 562, 570 is displayed in grid 500. In the grid 500 shown in FIG. 5B, password images 510, 514 and 516 are shown originally in locations 534, 544 and 542, respectively, while decoy images 550, 552, 554, 560, 562, 570 are shown in locations 520, 522, 524, 530, 532, 540, respectively.

Referring to FIG. 5C, a user enters his or her image-based password by repositioning the password images into the established locations within the grid 500 shown in FIG. 5A. For example, image 510 is repositioned to location 520, image 514 is repositioned to location 532 and image 516 is repositioned to location 540. Decoy images 550, 552, 554, 560, 562, 570 are shown in locations 522, 524, 530, 534, 542, 544. Once the password images 510, 514, 516 have been repositioned to the locations established by the user when he or she created his password, the user is authenticated, and is provided access to the secure system.

If the user fails to place each of the password images into its predetermined location within the grid, he or she may be provided one or more number of additional iterations or opportunities to appropriately reposition the password images, each time presenting a different arrangement of images within the grid 500 for display to the user. If the user has not placed the password images into their respective locations after a predetermined number of iterations or opportunities has elapsed, the system may preclude the user from attempting to obtain access to the system for a period of time, or may alert an administrator as to the user's failure to authenticate properly.

The process represented by flow chart 400 shown in FIG. 4 requires a user to create an image-based password by placing password images into established locations on a grid displayed on a user interface, and represents just one embodiment of a method for performing image-based authentication prior to providing access to a secure system or network. However, the methods of the present invention need not require an actual grid to be displayed in order to create an image-based password. Rather, a user may create an image-based password by locating password images in any portion of a screen or user interface, provided that the user returns the password images to the established locations on the screen each time that he or she requests access to the secure system or network.

As is shown in FIGS. 5B and 5C, decoy images 550, 552, 554, 560, 562, 570 are included within the grid along with the password images 510, 514, 516 selected by the user. If a user creates an image-based password by selecting password images that are too similar to one another, the user may, unwittingly, create a risk that the image-based password may be compromised, because the password images might stand out, to a hacker or fraudster, as different from the decoy images. Therefore, according to one embodiment of the present invention, the images identified by a user as password images may be tagged or labeled with one or more tags, categories or descriptors, or may be otherwise analyzed in order to determine or otherwise classify the contents of the password images. Thereafter, when selecting decoy images to be displayed along with password images, such as is shown in FIG. 5B, the systems and methods of the present invention may attempt to identify images having the same or similar tags, categories or descriptors as one or more of the password images, such that the password images may not be distinguished from the decoy images based on their collective category or other commonality.

For example, where a user selects images of a football helmet, a hockey puck and a basketball hoop as password images, each of these images may be tagged as members of the category "sports." Therefore, when displaying decoy images with the password images during an image-based authentication process, the systems and methods of the present invention may display other images in the category "sports," i.e., a golf ball, a tennis racket, a bicycle, a skier, or a lacrosse stick as decoy images, such that the password images may not be distinguished from the decoy images based on the content displayed therein. Similarly, if some of the password images shares a common color, i.e., blue, or include common features, i.e., famous buildings, then the systems and methods of the present invention may preferentially identify decoy images that are also blue or display famous buildings. Any commonality shared by one or more password images may serve as the basis for the selection of decoy images by the systems and methods of the present invention.

Additionally, according to some embodiments, the systems and methods of the present invention may apply facial recognition software or other related means in order to determine whether any faces are present in the password images. If a password image includes a face, then it may be deemed more likely to be a password image by a hacker or fraudster who may have access to other images containing the face, and identify the password images as such. For example, if a hacker or fraudster has obtained a user's portable computer or mobile phone, which frequently contain images including personal photographs, the hacker or fraudster may be able to identify images that the user might have used to establish an image-based password, and ultimately breach the secure system or network. Therefore, one embodiment of the systems and methods of the present invention may alert the user when an image appears to contain faces, and may recommend that the user identify other, alternative images to be used as password images.

Moreover, in embodiments of the systems and methods of the present invention which require a user to reposition password images into established locations within a grid, the systems and methods need not include decoy images in spaces within the grid that do not include password images. For example, the grid may be completely empty, with the exception of the password images. Alternatively, the grid may be completely filled with password images, and need not include any empty spaces. For example, in the example of a three-by-three (3×3) grid shown in FIG. 5A, the systems and methods of the present invention may permit a user to create an image-based password by placing up to nine password images into established locations on the grid 500. In order to gain access to a secure system or network, the user may be prompted to reposition each of the password images into their respective positions on the grid 500.

Figure 6:
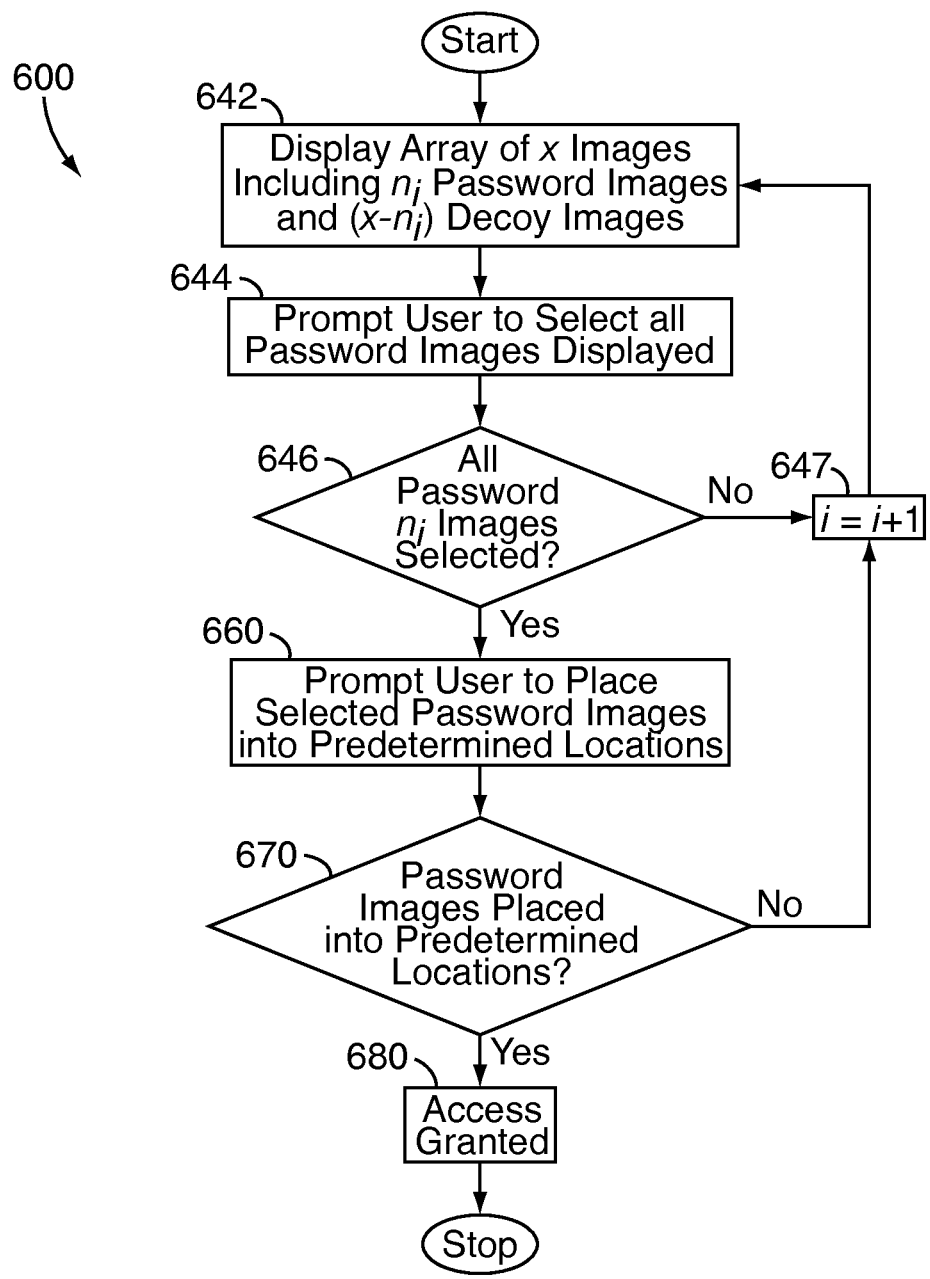
FIG. 6 is a flow chart of a method for performing image-based authentication in accordance with an embodiment of the present disclosure.

Referring to FIG. 6, a flow chart 600 representing one embodiment of a method for authenticating a user based on an image-based password at a secure system is shown. Except where otherwise noted, reference numerals preceded by the number "6" in FIG. 6 indicate elements that are similar to elements of the flow chart 200 shown in FIG. 2 or the flow chart 400 shown in FIG. 4 as having reference numerals preceded by the numbers "2" or "4," respectively.

At step 642, the system displays an array of x images, including $n_i$ password images and $(x-n_i)$ decoy images to the user. At step 644, the user is prompted to select all password images that are displayed in the array, but is not informed as to the number of password images that he or she must select. At step 646, if the user fails to select each of the $n_i$ password images displayed in the array, then the number of iterations i is incremented by one at step 647, and the system returns to step 642.

If the user selects each of the images displayed in the array, then at step 660, the user is prompted to place the selected images into predetermined locations on a grid. At step 670, if the user fails to place the selected images into their predetermined locations, then at step 647, the number of iterations i is incremented by one at step 647, and the system returns to step 642. If the selected images are placed into their respective predetermined locations, then at step 680, access is granted to the secure system.

Figure 7A:
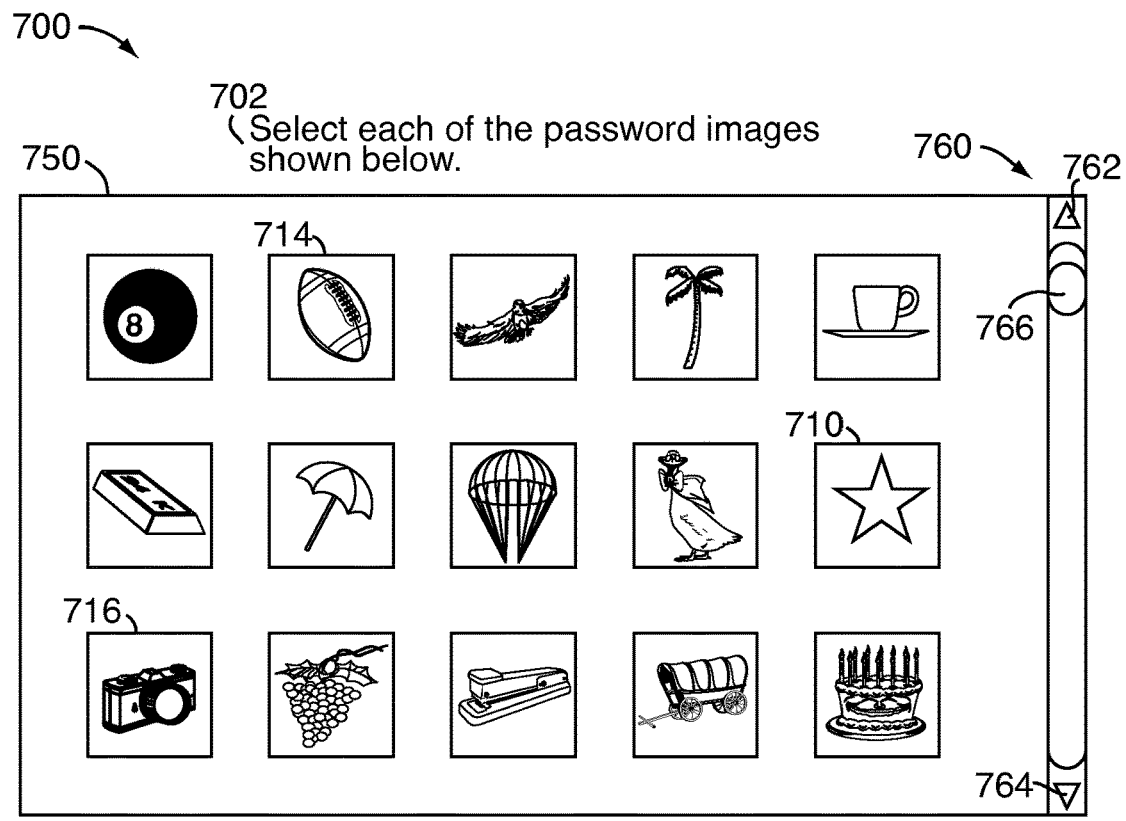
FIGS. 7A, 7B and 7C are user interfaces in accordance with embodiments of the present disclosure.
Figure 7B:
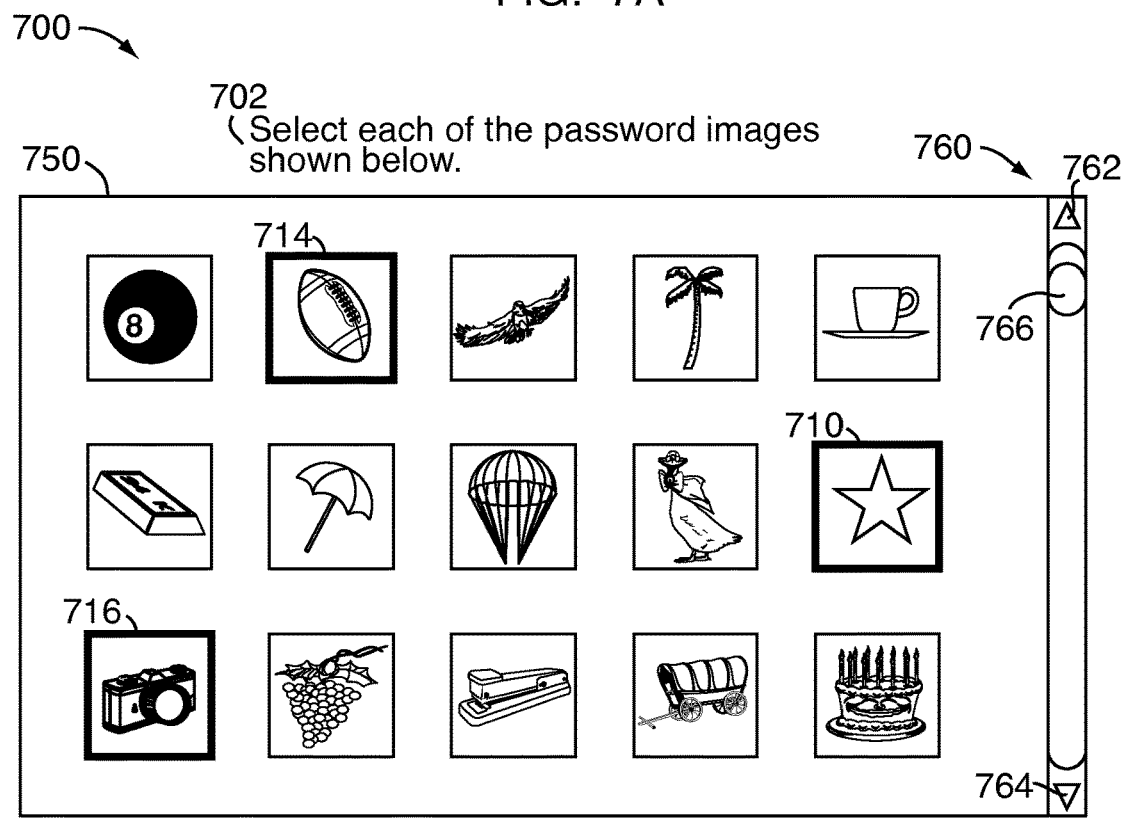
Figure 7C:
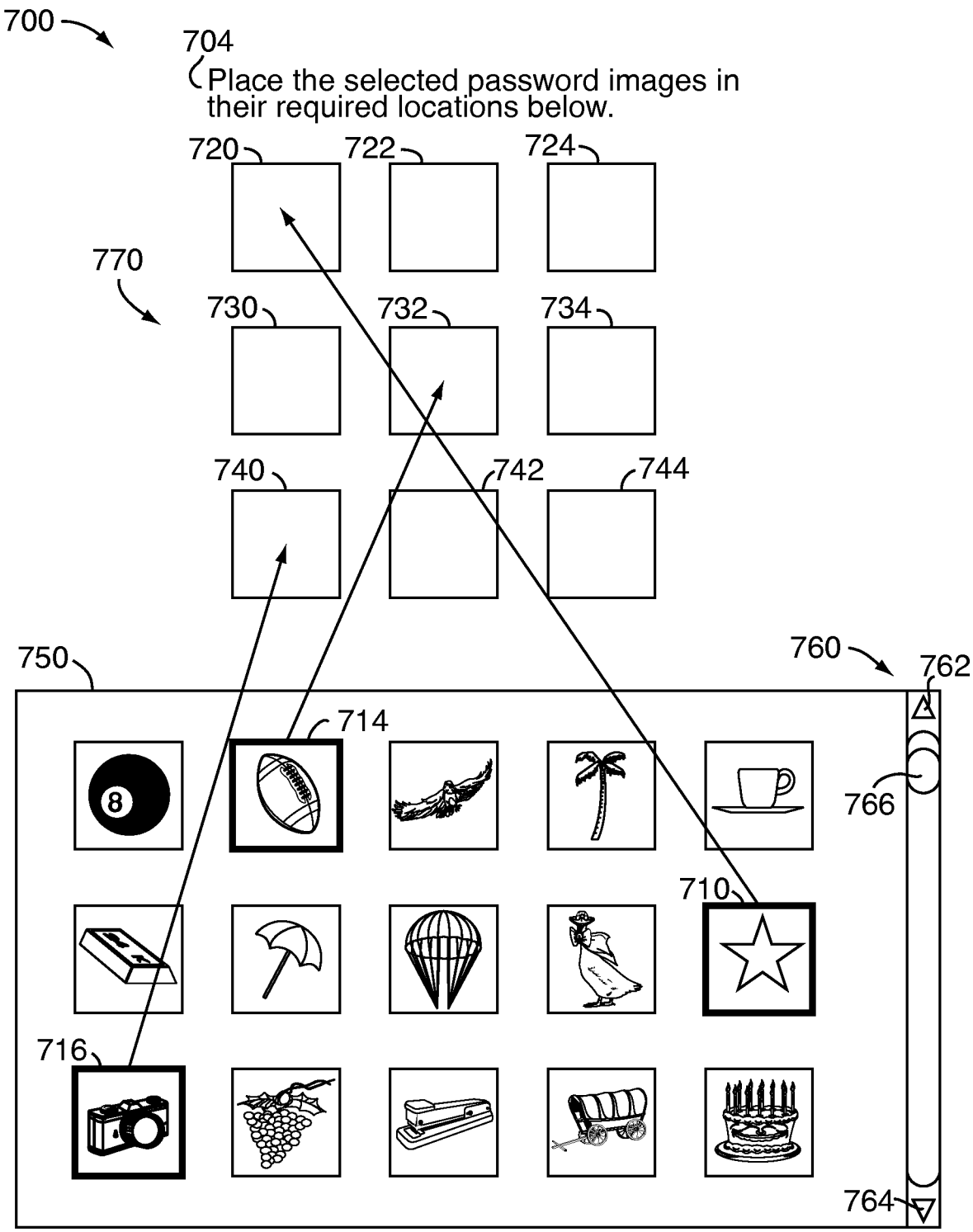

A series of user interfaces for establishing an image-based password consistent, and for performing image-based authentication, consistent with the process represented by flow chart 600 of FIG. 6 is shown in FIGS. 7A, 7B and 7C. Except where otherwise noted, reference numerals preceded by the number "7" in FIGS. 7A, 7B and 7C indicate elements that are similar to elements of the user interfaces 300, 302, 304 shown in FIG. 3B as having reference numerals preceded by the number "3."

Referring to FIG. 7A, a user interface 700 provides includes a prompt 702 that instructs a user to select each of the password images displayed in the array of images shown in window 750, which includes password images 710, 714, 716. However, the prompt 702 does not inform the user as to how many password images must be selected. As is shown in FIG. 7A, window 750 contains fifteen images, but may also include features such as scroll bar 760, buttons 762, 764 and slide 766, which may be used to view images displayed throughout the window 750. Referring to FIG. 7B, the user interface 700 shows password images 710, 714, 716 as having been selected by the user.

Referring to FIG. 7C, the user interface 700 includes a prompt 704 that instructs the user to place the selected password images into their respective predetermined locations within the grid 770. If the user places each of the password images 710, 714, 716 into locations 720, 732 and 740, respectively, then the user is authenticated. If the user fails to place any one of the password images 710, 714, 716 into its predetermined location within the grid, however, the user will not be authenticated, and will be required to repeat the authenticated process.

Figure 8:
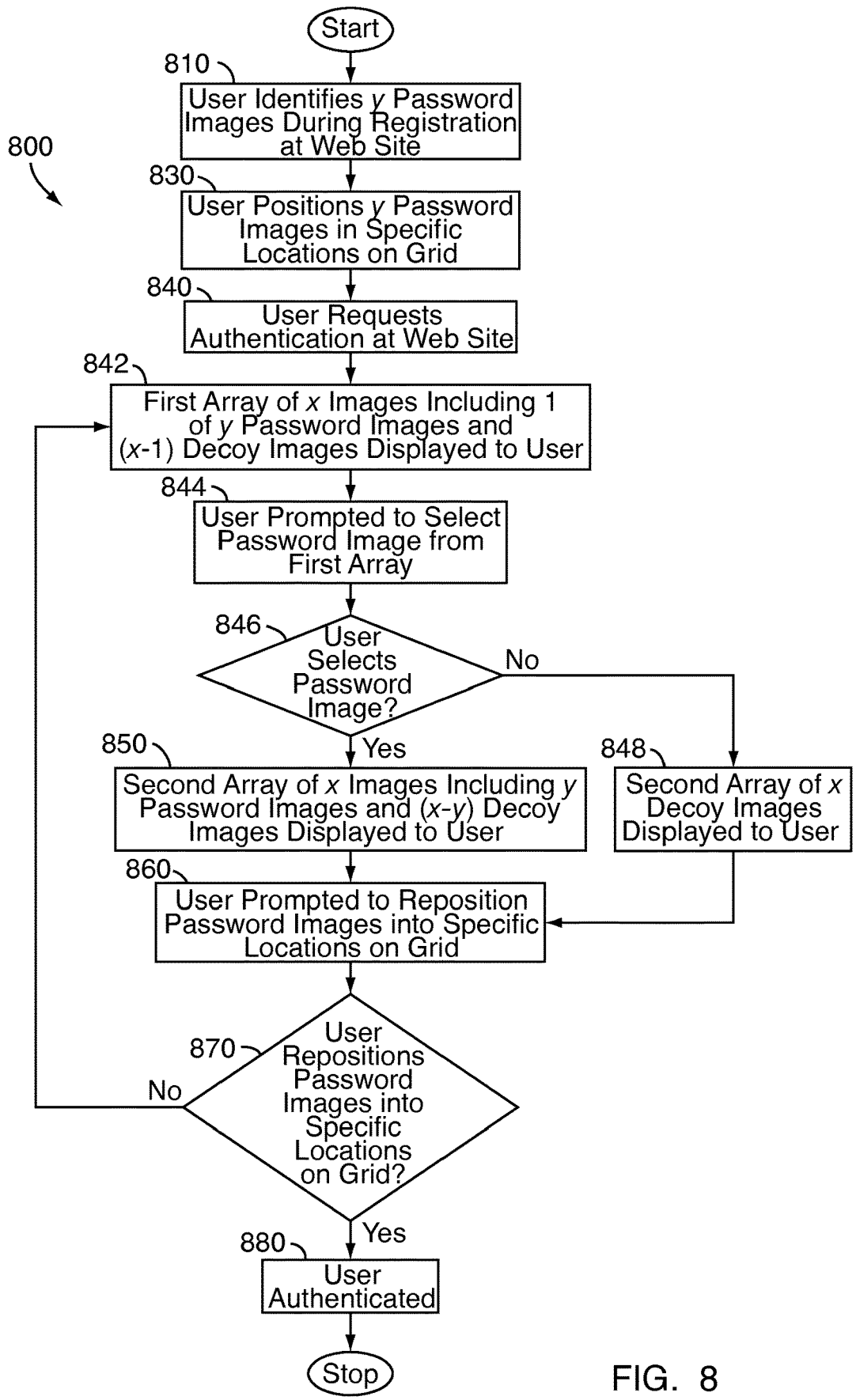
FIG. 8 is a flow chart of a method for performing image-based authentication in accordance with an embodiment of the present disclosure.

As is discussed above, the systems and methods of the present invention may utilize one or more image-based passwords for image-based authentication in combination. Referring to FIG. 8, a flow chart 800 representing one embodiment of a method for authenticating a user based on an image-based password at a secure system is shown.

Except where otherwise noted, reference numerals preceded by the number "8" in FIG. 8 indicate elements that are similar to elements of the flow chart 200 shown in FIG. 2, the flow chart 400 shown in FIG. 4 or the flow chart 600 shown in FIG. 6 as having reference numerals preceded by the numbers "2," "4" or "6," respectively.

At step 810, a user identifies y password images during his or her registration at a secure web site. The user may, for example, identify password images that are located in a cache or image library, downloaded from the Internet, or uploaded from a device such as a digital camera, scanner or smart phone. At step 830, the user creates an image-based password by repositioning the y password images into the specific locations on a grid of his or her choosing. At step 840, the user may then return to the web site in order to request authentication.

At step 842, the web site may display a first array of x images, including one of the y password images, along with (x−1) decoy images, to the user. The one of the y password images displayed in the first array may be referred to as a "starter image." At step 844, the user may be prompted to select the starter image from the first array. At step 846, if the user correctly selects the starter image, then at step 850, a second array of x images including y password images and (x−y) decoy images may be displayed to the user. If, however, the user fails to select the starter image from the first array, then at step 848, a second array of x images consisting entirely of decoy images is displayed to the user.

At step 860, the user is prompted to reposition all of the password images that he or she recognizes into the appropriate locations of the grid. If the user correctly repositions the password images into the specific locations at step 870, then the user is authenticated 880, and provided access to the secure web site. If, however, the user fails to correctly reposition the password images into their appropriate locations, the process returns to step 842, where a new array containing x images, including one password image and (x−1) decoy images is displayed.

Preferably, the password image displayed during any repeat iteration of step 842 is different from the one password image displayed during a previous iteration of step 842, in order to protect the system from brute force attacks designed to identify the password images displayed in the array. Additionally, as is discussed above, the second array of x images displayed to the user at step 848 after a user failed to select the starter image from the first array consists entirely of decoy images, and does not contain any password images. Therefore, the user cannot successfully reposition password images into the specific locations on the grid at step 860, and this cannot access the secure web site, if the user fails to correctly select the password image at step 846. This feature, too, is intended to protect the system from brute force attacks designed to identify the password images displayed in the array.

The systems and methods of the present disclosure provide a simple and effective method for authenticating users who attempt to enter secure systems or networks by requiring the entry of passwords consisting of images, and not letters, numbers or other characters. Moreover, the systems and methods disclosed herein also provide flexible solutions for securing access using image-based features that may be hand-picked by users, and may be easily entered without requiring the use of a keyboard. By their very nature, image-based passwords are more easily remembered by an authorized user, and may be selected from an infinite number of potential combinations, and are thus believed to be more secure than character-based passwords.

Although the disclosure has been described herein using exemplary techniques, components, and/or processes for implementing the present disclosure, including the use of image-based passwords to enter secure systems and networks, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, the systems and methods described herein may be adapted to restrict access to individual digital files, such as text documents or spreadsheets, or for any other purpose.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A method for image-based authentication comprising:
receiving a designation of a starter image from at least one user over a computer network;
receiving a plurality of password images from the at least one user over the computer network;
causing a display of the plurality of password images on a first user interface provided on at least one computer display,
receiving a configuration of the plurality of password images on the first user interface over the computer network, wherein the configuration includes a specific location for each of the plurality of password images on the first user interface;
storing information associating the configuration of the plurality of the password images with access to a secure computer system in at least one data store;
causing a display of a second plurality of images in a first array on a second user interface provided on the at least one computer display, wherein the second plurality of images includes the starter image;
receiving a selection of one of the second plurality of images in the first array on the second user interface from the at least one user;
determining whether the selected one of the second plurality of images is the starter image by at least one computer processor;
in response to determining that the selected one of the second plurality of images is the starter image, causing a display of a third plurality of images in a second array on a third user interface provided on the at least one computer display, wherein the third plurality of images comprises the plurality of password images, and wherein each of the third plurality of images is displayed in one of a plurality of locations in the second array at random;

receiving an arrangement of the third plurality of images in the second array on the third user interface by the at least one user, wherein receiving the arrangement of the second array of images comprises receiving a repositioning of one of the third plurality of images from a first location in the second array to a second location in the second array;

determining whether the arrangement of the third plurality of images in the second array comprises the configuration of the plurality of the password images using at least one computer processor; and in response to determining that the arrangement of the third plurality of images in the second array comprises the configuration of the plurality of the password images,
    granting access to the secure computer system to the at least one user.

2. The method according to claim 1, further comprising:
storing information associating a character-based user name and a character-based password with access to the secure computer system in the at least one data store;

receiving, via a fourth user interface, a first character-based entry;

receiving, via the fourth user interface, a second character-based entry; and determining whether the first character-based entry consists of the character-based user name and whether the second character-based entry consists of the character-based password, wherein the display of the second plurality of images in the first array is caused on the second user interface in response to determining that the first character-based entry consists of the character-based user name and that the second character-based entry consists of the character-based password.

3. The method according to claim 1, wherein the at least one computer display is a touchscreen display, wherein the selection of the one of the second plurality of images in the first array comprises a touching interaction with the touchscreen display, and wherein the repositioning of the one of the third plurality of images from the first location in the second array to the second location in the second array comprises a dragging interaction with the touchscreen display.

4. The method according to claim 1, further comprising:
in response to determining that the selected one of the second plurality of images is not the starter image,
    causing display of a fourth plurality of images in the second array of images on the third user interface provided on the at least one computer display, wherein the fourth plurality of images does not include at least one of the password images.

\* \* \* \* \*